US007948712B2

(12) United States Patent
Martin

(10) Patent No.: US 7,948,712 B2
(45) Date of Patent: May 24, 2011

(54) DUAL THICKNESS CARBON OVERCOAT

(75) Inventor: Richard E. Martin, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 816 days.

(21) Appl. No.: 11/750,599

(22) Filed: May 18, 2007

(65) Prior Publication Data

US 2007/0268622 A1 Nov. 22, 2007

Related U.S. Application Data

(60) Provisional application No. 60/747,653, filed on May 18, 2006.

(51) Int. Cl.
*G11B 5/60* (2006.01)
*G11B 15/64* (2006.01)

(52) U.S. Cl. .............................. 360/235.1; 360/125.74

(58) Field of Classification Search ............. 360/125.31, 360/125.32, 125.74, 125.75, 234.3, 235.1, 360/235.2, 235.3
See application file for complete search history.

(56) References Cited

U.S. PATENT DOCUMENTS

| | | | |
|---|---|---|---|
| 5,151,294 A | 9/1992 | Bleich et al. | |
| 5,175,658 A * | 12/1992 | Chang et al. | 360/235.2 |
| 5,470,447 A | 11/1995 | Mahvan et al. | |
| 5,768,055 A * | 6/1998 | Tian et al. | 360/235.2 |
| 5,940,249 A | 8/1999 | Hendriks | |
| 5,943,187 A | 8/1999 | Chen et al. | |
| 5,985,163 A * | 11/1999 | Cha et al. | 216/22 |
| 5,986,851 A * | 11/1999 | Angelo et al. | 360/235.2 |
| 5,991,113 A * | 11/1999 | Meyer et al. | 360/75 |
| 6,014,288 A * | 1/2000 | Cha et al. | 360/236.6 |
| 6,117,283 A | 9/2000 | Chen et al. | |
| 6,359,754 B1 | 3/2002 | Riddering et al. | |
| 6,760,182 B2 | 7/2004 | Bement et al. | |
| 6,842,308 B1 * | 1/2005 | Pust et al. | 360/234.7 |
| 6,914,750 B2 * | 7/2005 | Garfunkel et al. | 360/234.3 |
| 2003/0174430 A1 * | 9/2003 | Takahashi et al. | 360/75 |
| 2004/0201920 A1 * | 10/2004 | Koide et al. | 360/128 |
| 2005/0201012 A1 * | 9/2005 | Kasamatsu et al. | 360/235.1 |

* cited by examiner

*Primary Examiner* — Brian E Miller
*Assistant Examiner* — Adam B Dravininkas
(74) *Attorney, Agent, or Firm* — Kinney & Lange, P.A.

(57) ABSTRACT

A transducer carrying structure includes a first portion carrying the transducer, a second portion spaced from the transducer, and a spacing control actuation system operable to adjust a position of the first portion of the transducer carrying structure. An overcoat is provided on a surface of the transducer carrying structure. The overcoat has a first thickness in the first region of the transducer carrying structure and a second thickness in the second region of the transducer carrying structure, the second thickness being greater than the first thickness. This configuration provides increased wear robustness to the transducer carrying structure without causing the transducer to be excessively spaced from a medium during operation of the transducer.

19 Claims, 5 Drawing Sheets

DUAL THICKNESS CARBON OVERCOAT

CROSS-REFERENCE TO RELATED APPLICATION(S)

This application claims the benefit of U.S. Provisional Application No. 60/747,653 filed May 18, 2006 for "Dual Thickness Carbon Overcoat" by R. Martin.

INCORPORATION BY REFERENCE

The aforementioned U.S. Provisional Application No. 60/747,653 is hereby incorporated by reference in its entirety.

BACKGROUND

The present invention relates to a dual thickness carbon overcoat structure for protecting the medium-confronting surface of a transducer carrying structure, in which the overcoat has a first thickness in a region of the structure where the transducer is carried, and has a second thickness greater than the first thickness in other regions of the structure.

In disc drives and other transducing systems, a transducer is carried by a structure adjacent to a storage medium. Over time, operation of the system can cause wear of the surface of the structure that confronts the storage medium, which is undesirable for a number of reasons. In order to protect the structure against wear, an overcoat (formed with a relatively thin layer of material such as carbon) is provided on the surface of the structure confronting the storage medium.

Traditionally, increases in wear robustness have been achieved by increasing the overcoat thickness everywhere on the medium-confronting surface of the transducer carrying structure, including the region of the structure that carries the transducer. However, this improvement in wear robustness comes at the expense of increased spacing between the transducer and the medium due to the thicker protective layer, which is undesirable in many applications.

It would be useful in the art to provide additional protection against wear without increasing the spacing between the transducer and the medium.

SUMMARY

In accordance with the present invention, a transducer carrying structure includes a first portion carrying the transducer, a second portion spaced from the transducer, and a spacing control actuation system operable to adjust a position of the first portion of the transducer carrying structure. An overcoat is provided on a surface of the transducer carrying structure. The overcoat has a first thickness in the first region of the transducer carrying structure and a second thickness in the second region of the transducer carrying structure, the second thickness being greater than the first thickness. This configuration provides increased wear robustness to the transducer carrying structure without causing the transducer to be excessively spaced from a medium during operation of the transducer.

DETAILED DESCRIPTION

Figure 1:
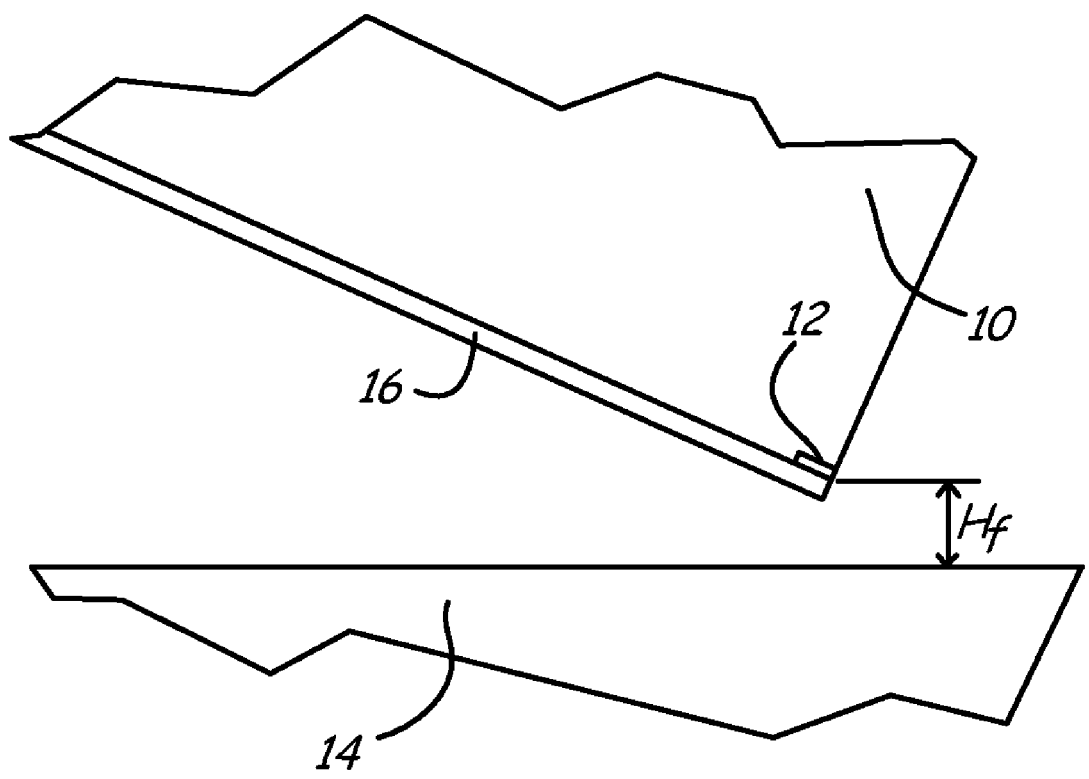
FIG. 1 is a diagram illustrating a transducer carrying structure having a transducer spaced from a medium by a height Hf.

FIG. 1 is a diagram illustrating transducer carrying structure 10 having transducer 12 spaced from medium 14 by a height Hf. In systems employing transducer 12 for transducing data with medium 14, it is often desirable for the transducer-to-medium spacing Hf to be as small as possible. In many of these same systems, it is also desirable for the bottom surface of transducer carrying structure 10 to be protected against wear and contamination. This protection is provided by overcoat 16. In some systems, overcoat 16 is a carbon overcoat (COC) having a thickness of about 2 nanometers (nm).

In order to configure the system shown in FIG. 1 to have additional protection against wear, the thickness of overcoat 16 can be increased. However, this increase in thickness uses up the budget of available space between transducer 12 and medium 14, and thus often requires the transducer-to-medium spacing Hf to be increased as well (which is often undesirable) to ensure that contact between overcoat 16 and medium 14 near transducer 12 does not occur.

Figure 2A:
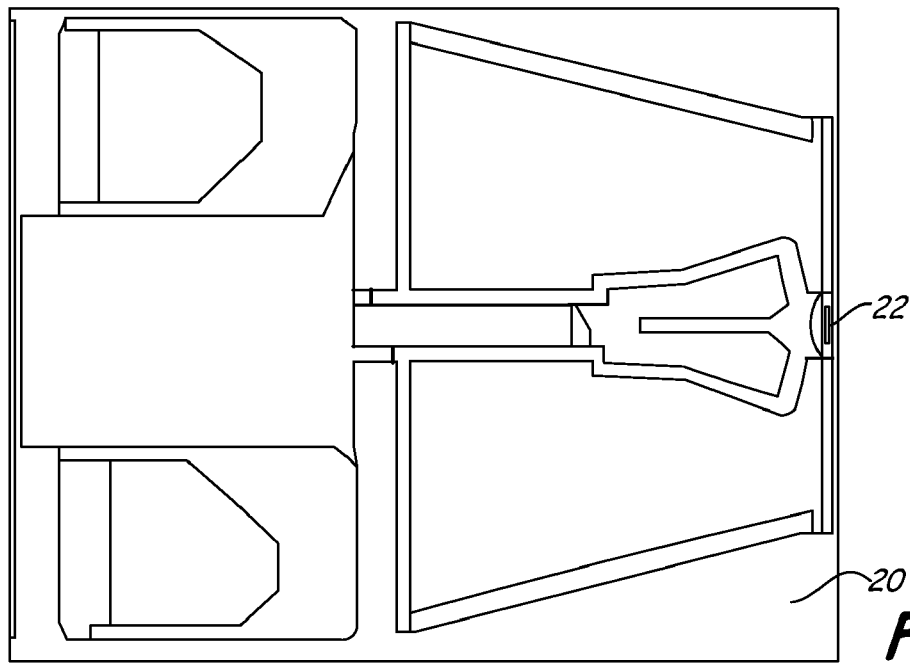
FIG. 2A is a bottom view of a transducer carrying structure according to an embodiment of the present invention.
Figure 2B:
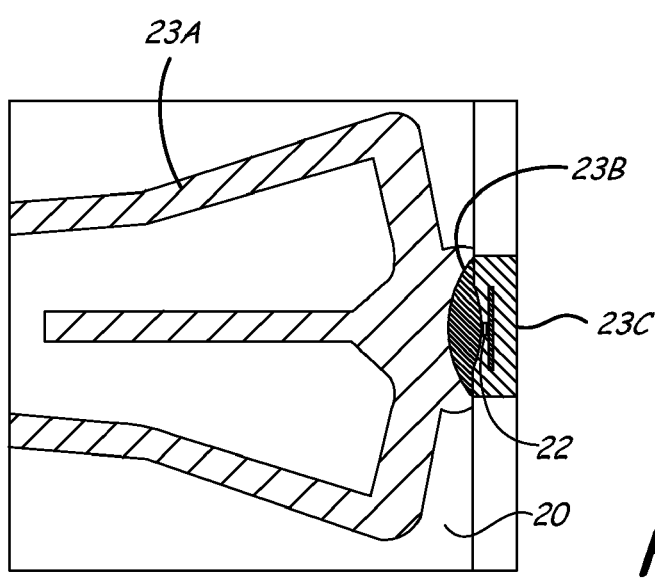
FIG. 2B is an enlarged bottom view of the transducer carrying portion of the transducer carrying structure shown in FIG. 2A.

FIG. 2A is a bottom view of transducer carrying structure 20 according to an embodiment of the present invention, and FIG. 2B is an enlarged bottom view of the transducer carrying portion of transducer carrying structure 20. Transducer carrying structure 20 is shown as including a number of geometric features on its bottom surface, which may vary for different embodiments. Transducer carrying structure 20 carries transducer 22 at one end of the structure. The portions 23A of transducer carrying structure 20 shown in sparse right-to-left downward sloping hash lines are located on a bottom surface of the structure, and are coated with an increased thickness of overcoat (such as a dual layer thickness). The portions 23B of transducer carrying structure 20 shown in dense left-to-right downward sloping hash lines are also located on a bottom surface of the structure, and are coated with a regular thickness of overcoat (such as a single layer thickness). The portions 23C of transducer carrying structure 20 shown in sparse left-to-right downward sloping hash lines are recessed and filled around transducer 22, and also are coated with a regular thickness of overcoat (such as a single layer thickness). The result of the overcoat thicknesses applied to transducer carrying structure 20 is to provide a thicker overcoat thickness in the portion 23A of transducer carrying structure 20 that is spaced from transducer 22 than in the portion 23B, 23C of the transducer carrying structure that carries transducer 22.

Any effect on the spacing between transducer 22 and a confronting medium due to the increased thickness of overcoat is mitigated by a spacing control actuation system provided for transducer carrying structure 20. Many types of actuation systems are known in the art for providing this ability, such as thermal protrusion actuation systems in which a heater is provided to cause portions of the transducer carrying structure to expand and adjust the position of the transducer with respect to the medium, piezoelectric actuation systems in which deformation of a piezoelectric material is used to adjust the position of the transducer with respect to the medium, and others. The portion of transducer carrying structure 20 that is positionable by the spacing control actuation system (i.e., the transducer-carrying portion) has a smaller overcoat thickness than the portion of transducer carrying structure that is spaced from transducer 22 (i.e., the non-transducer-carrying portion), so that the transducer-to-medium spacing is not adversely affected by the increased overcoat thickness applied to transducer carrying structure 20.

Figure 3B:
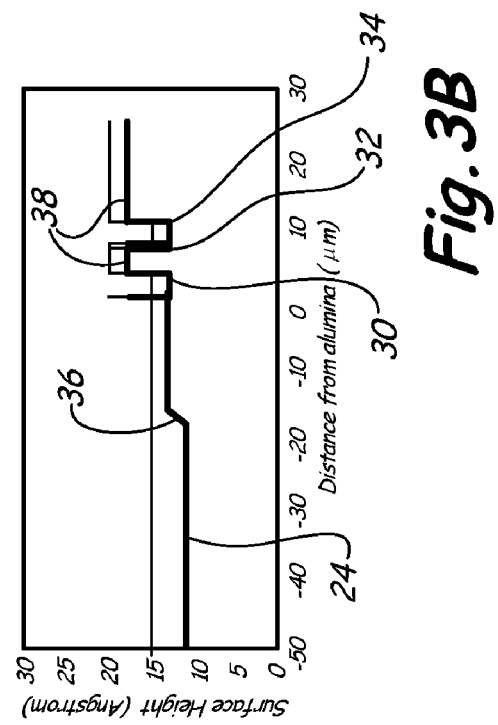
FIG. 3B is a graph illustrating the contours of the bottom of the transducer carrying structure and overcoat shown in FIG. 3A.
Figure 3A:
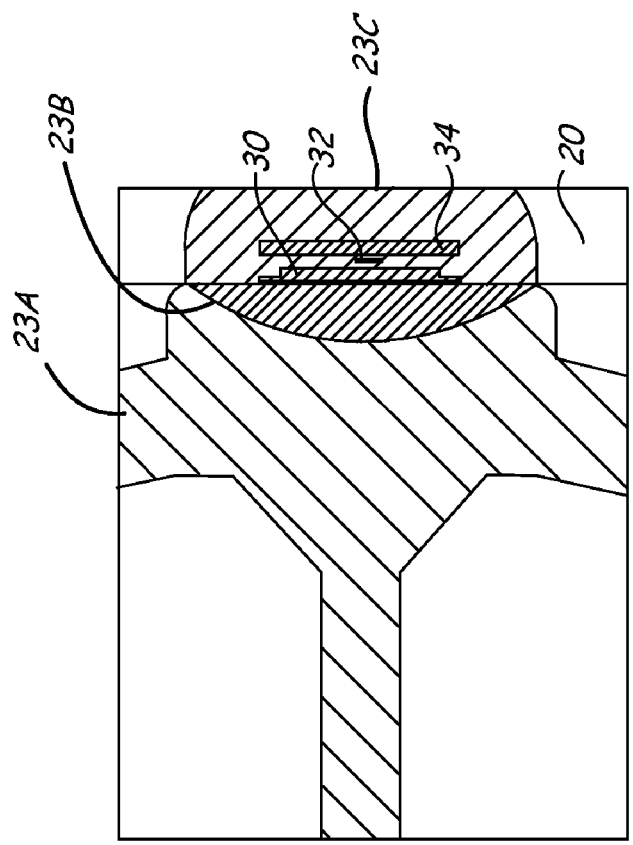
FIG. 3A is a further enlarged bottom view of the transducer carrying portion of the transducer carrying structure shown in FIGS. 2A and 2B.

FIG. 3A is a further enlarged bottom view of the transducer carrying portion of transducer carrying structure 20, and FIG. 3B is a graph illustrating the contours of the bottom of transducer carrying structure 20 and overcoat 24. Transducer carrying structure 20 includes reader element 30, writer element 32, and feature 34. The overcoat on the bottom surface of transducer carrying structure 20 transitions from a larger thickness to a smaller thickness at the location referred to by reference numeral 36. The recessed area around reader element 30, writer element 32 and feature 34 is shown by the increased surface height level shown in FIG. 3B and referred to by reference numeral 38.

The contours of the bottom of the transducer carrying structure are illustrated and explained in more detail below by Comparative Example A (utilizing regions of different overcoat thicknesses without spacing control actuation) and Example B (utilizing regions of different overcoat thicknesses with spacing control actuation).

EXAMPLES

Comparative Example A

Figure 4:
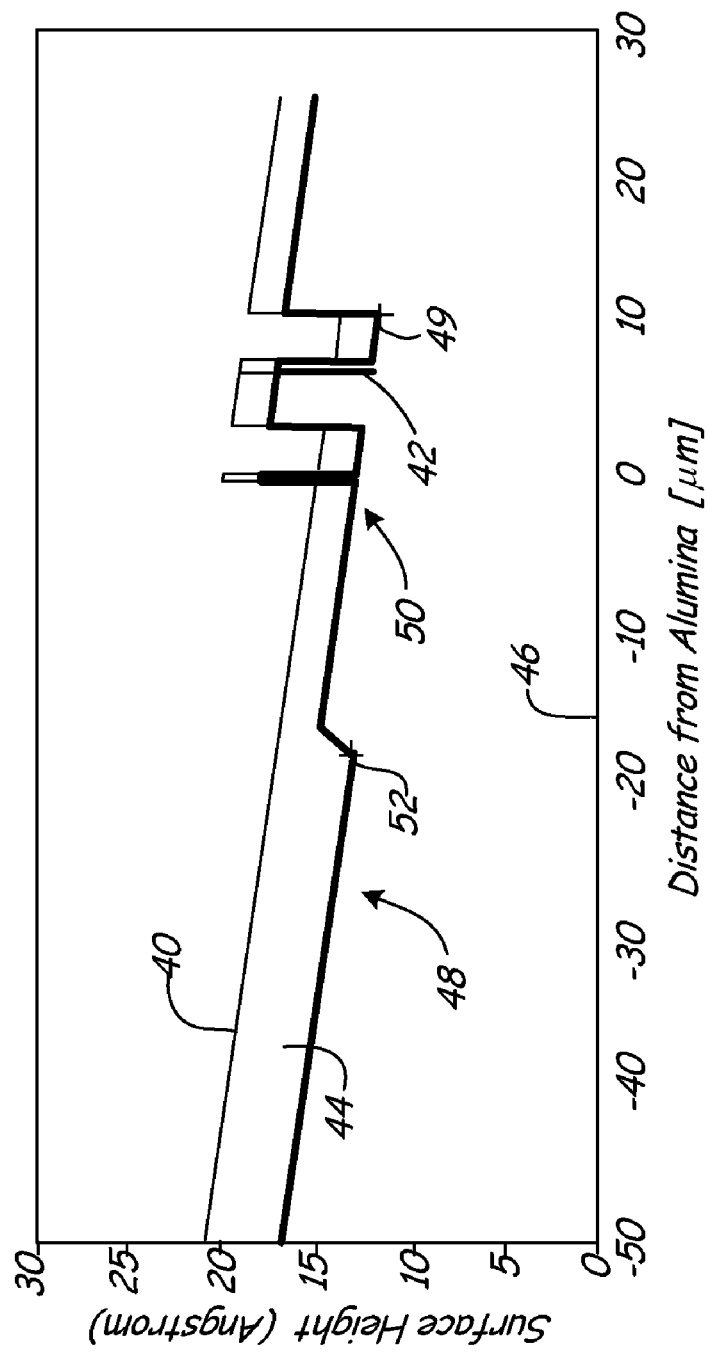
FIG. 4 is a graph showing the contours of the bottom of the transducer carrying structure and overcoat when the transducer carrying structure is supported adjacent to a medium in an operating state with a pitch of 120 microradians (μrads) and with no spacing control adjustment.

FIG. 4 is a graph showing the contours of the bottom of transducer carrying structure 40 and overcoat 44 when transducer carrying structure 40 is supported adjacent to medium 46 in an operating state with a pitch of 120 microradians (μrads). Transducer carrying structure 40 is shown without any spacing control actuation to bring write element 42 nearer to the surface of medium 46. In this configuration, overcoat 44 has a thickness of about 4 nanometers (nm) in region 48 spaced from the transducer (i.e., write element 42), and has a thickness of about 2 nm in region 50 adjacent the transducer (i.e., write element 42), although these thickness values can vary between embodiments. The transition from the larger thickness of overcoat 44 to the smaller thickness of overcoat 44 is located at point 52, which is about 18 μm from the point at which transducer carrying structure 40 transitions from alumina/titanium carbide composite (AlTiC) to alumina. The point of lowest separation from medium 46 in this example is 11.692 Angstroms (Å) (at feature 49), while the point at which the thickness of overcoat 44 transitions from the larger thickness to the smaller thickness is separated from medium 46 by 13.16 Å. In some applications, it is desirable for the difference in separations at these two points to be larger than this.

Example B

Figure 5:
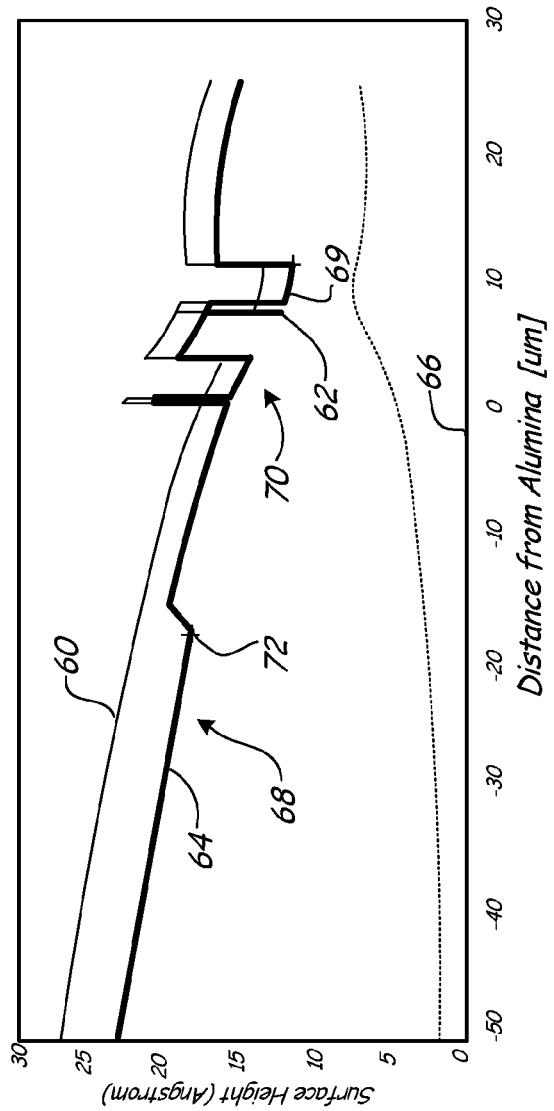
FIG. 5 is a graph showing the contours of the bottom of the transducer carrying structure and overcoat when the transducer carrying structure is supported adjacent to a medium in an operating state with a pitch of 120 μrads and a thermally actuated protrusion to provide a peak spacing control adjustment.
Figure 6:
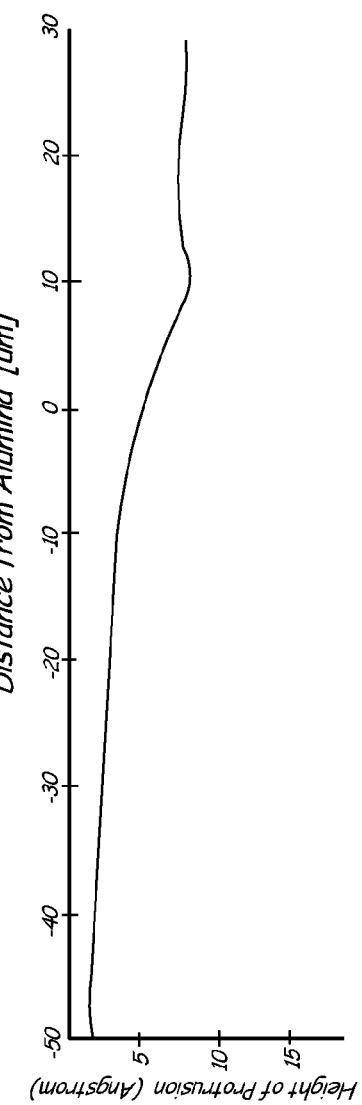
FIG. 6 is a graph showing the contour of the thermally actuated protrusion provided in the spacing control adjustment of FIG. 5.

FIG. 5 is a graph showing the contours of the bottom of transducer carrying structure 60 and overcoat 64 when transducer carrying structure 60 is supported adjacent to medium 66 in an operating state with a pitch of 120 μrads and a thermally actuated protrusion to provide a peak spacing control adjustment of about 8 nm (the complete shape of the thermal protrusion is shown in FIG. 6). In this configuration, as with the configuration of Comparative Example A, overcoat 64 has a thickness of about 4 nm in region 68 spaced from the transducer (i.e., write element 62), and has a thickness of about 2 nm in region 70 adjacent the transducer (i.e., write element 62), although these thickness values can vary between embodiments. The transition from the larger thickness of overcoat 64 to the smaller thickness of overcoat 64 is located at point 72, which is about 18 μm from the point at which transducer carrying structure 60 transitions from AlTiC to alumina. With actuation (via thermal protrusion) of the spacing control system, the point of lowest separation from medium 66 is 11.928 Å (at feature 69), while the point at which the thickness of overcoat 64 transitions from the larger thickness to the smaller thickness is separated from medium 66 by 18.357 Å. The thermally actuated protrusion therefore makes the difference in separations between these two points larger than for a non-actuated system, such as by at least about 4 Angstroms in some embodiments (although larger and smaller amounts of change are achievable as well).

The dual thickness overcoat configuration described above is readily achievable by adding an additional photo step during overcoat deposition. For example, a thin layer of overcoat may be deposited over the entire surface of the transducer carrying structure, corresponding to the final thickness of the overcoat in the transducer carrying portion of the transducer carrying structure. In an exemplary embodiment, the thickness of this layer is about 2 nm. The transducer carrying portion of the transducer carrying structure is then masked, and an additional layer of overcoat is deposited on the unmasked area. In an exemplary embodiment, the thickness of this additional layer is about 2-4 nm, although even thicker layers could be used in some systems. The mask is then removed, leaving the transducer carrying portion of the transducer carrying structure with a thinner layer of overcoat and the remaining portion of the transducer carrying structure with a thicker layer of overcoat. This increased overcoat thickness provides improved wear robustness to the transducer carrying structure while not increasing the transducer-to-medium spacing of the system due to the thinner layer of overcoat in the transducer carrying portion of the transducer carrying structure and the spacing control actuation system that is employed.

It should be understood that while the illustrations provided in the drawings that accompany this description depict the transducer carrying structure as a slider employable in a disc drive, the present invention is applicable to any transducer carrying structure and system for transducing data with a medium.

Although the present invention has been described with reference to preferred embodiments, workers skilled in the art will recognize that changes may be made in form and detail without departing from the spirit and scope of the invention.

The invention claimed is:

1. A transducer carrying structure comprising:
   a transducer;
   a first portion carrying the transducer;
   a second portion spaced from the transducer;
   a spacing control actuation system operable to adjust a position of the first portion of the transducer carrying structure; and
   an overcoat formed of a layer of a dual thickness carbon material, the layer of the dual thickness carbon material having a first thickness of the carbon material in the first portion of the transducer carrying structure and a second thickness of the carbon material in the second portion of the transducer carrying structure, the second thickness being greater than the first thickness.

2. The transducer carrying structure of claim 1, wherein the spacing control actuation system comprises a thermally actuable protrusion.

3. The transducer carrying structure of claim 1, wherein the first thickness is about 2 nanometers.

4. The transducer carrying structure of claim 1, wherein the second thickness is at least about 4 nanometers.

5. The transducer carrying structure of claim 1, wherein the transducer carrying structure is a slider employable in a disc drive.

6. The transducer carrying structure of claim 1, wherein the overcoat consists of a layer of carbon.

7. The transducer carrying structure of claim 1, wherein the transducer carrying structure includes an alumina/titanium carbide region and an alumina region, the alumina region being located in a recessed area around the transducer that is filled with alumina.

8. The transducer carrying structure of claim 7, wherein a transition from the alumina/titanium carbide region to the alumina region is located in the first portion of the transducer carrying structure.

9. The transducer carrying structure of claim 8, wherein the transition from the alumina/titanium carbide region to the alumina region is located about 18 micro-meters from a transition between the first region and the second region of the transducer carrying structure.

10. A transducer carrying structure for carrying a transducer adjacent to a medium, the transducer carrying structure comprising:
    a transducer;
    a first portion carrying the transducer, the first portion having a point with a first separation between the first portion of the transducer carrying structure and the medium;
    a second portion spaced from the transducer;
    an overcoat formed of a layer of dual thickness carbon material, the layer of the dual thickness carbon material having a first thickness of the carbon material in the first portion of the transducer carrying structure and a second thickness of the carbon material in the second portion of the transducer carrying structure, the second thickness being greater than the first thickness, with a transition point between the first portion having the first overcoat thickness and the second portion having the second overcoat thickness that is separated from the medium by a second separation that is greater than the first separation; and
    a spacing control actuation system operable to adjust a position of the first portion of the transducer carrying structure so that a difference between the first separation and the second separation is increased by actuation.

11. The transducer carrying structure of claim 10, wherein the spacing control actuation system comprises a thermally actuable protrusion.

12. The transducer carrying structure of claim 10, wherein first thickness is about 2 nanometers.

13. The transducer carrying structure of claim 10, wherein the second thickness is at least about 4 nanometers.

14. The transducer carrying structure of claim 10, wherein the transducer carrying structure is a slider employable in a disc drive.

15. The transducer carrying structure of claim 10, wherein the overcoat consists of a layer of carbon.

16. The transducer carrying structure of claim 10, wherein the transducer carrying structure includes an alumina/titanium carbide region and an alumina region, the alumina region being located in a recessed area around the transducer that is filled with alumina.

17. The transducer carrying structure of claim 16, wherein a transition from the alumina/titanium carbide region to the alumina region is located in the first portion of the transducer carrying structure.

18. The transducer carrying structure of claim 17, wherein the transition from the alumina/titanium carbide region to the alumina region is located about 18 micro-meters from a transition between the first region and the second region of the transducer carrying structure.

19. The transducer carrying structure of claim 10, wherein the difference between the first separation and the second separation is increased by at least about 4 Angstroms by actuation of the spacing control actuation system.

* * * * *